(12) United States Patent
Lin

(10) Patent No.: US 8,761,267 B2
(45) Date of Patent: Jun. 24, 2014

(54) NOISE ESTIMATOR DEVICE OF VIDEO DECODER AND RELATED METHOD

(75) Inventor: Hsin-I Lin, I-Lan (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 1805 days.

(21) Appl. No.: 11/682,835

(22) Filed: Mar. 6, 2007

(65) Prior Publication Data

US 2008/0089429 A1    Apr. 17, 2008

(30) Foreign Application Priority Data

Oct. 12, 2006    (TW) ............................ 95137540 A

(51) Int. Cl.
*H04N 7/12*    (2006.01)

(52) U.S. Cl.
USPC ............ 375/240.28; 375/240.24; 375/240.25; 375/240.26; 375/240.27; 375/240.29; 348/425.4; 348/426.1; 348/427.1; 348/428.1; 348/429.1

(58) Field of Classification Search
None
See application file for complete search history.

(56) References Cited

U.S. PATENT DOCUMENTS

| | | | | |
|---|---|---|---|---|
| 5,224,141 | A * | 6/1993 | Yassa et al. | 378/98.2 |
| 6,028,642 | A * | 2/2000 | Rinaldi et al. | 348/540 |
| 6,195,132 | B1 * | 2/2001 | Kimura et al. | 348/618 |
| 7,046,307 | B1 | 5/2006 | Hui | |
| 7,701,512 | B1 * | 4/2010 | Woodall et al. | 348/526 |
| 2005/0243213 | A1 * | 11/2005 | Alvarez | 348/618 |

FOREIGN PATENT DOCUMENTS

| | | |
|---|---|---|
| EP | 1 435 730 A2 | 7/2004 |
| JP | 690389 | 3/1994 |
| WO | 88 03306 A1 | 5/1988 |

OTHER PUBLICATIONS

Wei-Ying Kung et al., "Spatial and Temporal Error COncealment Techniques for Video Transmission Over Noisy Channels," IEEE Transactions on Circuits and Systems for Video Technology, vol. 16, No. 7, Jul. 2006, pp. 789-802.*
Bernd Girod et al., "Distributed Video Coding," Proceedings of the IEEE, vol. 93, No. 1, Jan. 2005, pp. 71-83.*

* cited by examiner

*Primary Examiner* — Luu Pham
*Assistant Examiner* — Canh Le
(74) *Attorney, Agent, or Firm* — Winston Hsu; Scott Margo

(57) ABSTRACT

A noise estimator device of a video decoder includes a reception end, a low pass filter coupled to the reception end, a delay unit coupled to the reception end, a minimum level estimation unit coupled to the low pass filter for estimating a minimum of a specific number of low-pass results, a difference level estimation unit coupled to the low pass filter, the delay unit, and the minimum level estimation unit for determining a synchronization signal according to a plurality of low-pass results and the minimum of the specific number of the low-pass results, and for estimating a noise level according to the synchronization signal and signals outputted from the delay unit, and an output end coupled to the difference level estimation unit.

22 Claims, 11 Drawing Sheets

NOISE ESTIMATOR DEVICE OF VIDEO DECODER AND RELATED METHOD

BACKGROUND OF THE INVENTION

1. Field of the Invention

The present invention relates to a noise estimator device of a video decoder and related method, and more particularly, to a noise estimator device and related method capable of detecting durations of synchronization signals and determining noise levels according to the detected durations of the synchronization signals.

2. Description of the Prior Art

With the rapid development of the communication and computer technologies, video applications are more and more various. Most video applications, such as video conferences, video phones of the public switched telephone network or the mobile phone network, web cameras, and broadcast analog or digital TV, need efficient decoding operations, such that video signals can be reconstructed to video data for showing images with video output devices.

During the signal transmission (especially through radio channels), radio signals are inevitably interfered by noises, landforms, or terrain features, so that the transmitted signals are mixed with the noises, which cannot be analyzed. Therefore, the recognition ratio of the signals received by a reception end is very low, i.e. a corresponding 'eye' range is very small when the received signals are observed with an eye diagram. In this case, in order to decode broadcasted video signals correctly, the prior art video decoder usually applies a noise estimation device for estimating a noise level, so as to enhance the decoding reliability. Please refer to FIG. 1. FIG. 1 is a schematic diagram of a prior art video decoder device 10. The video decoder 10 includes an analog to digital converter 100, a digital signal processor 102, and a noise estimation unit 104. The analog to digital converter 100 is utilized for sampling and transforming analog video signals into digital signals. The digital signal processor 102 is utilized for performing calculations (such as demodulation or decoding) of signals outputted from the analog to digital converter 100, and outputting digital video signals to a video output device. In general, a video signal includes a horizontal or vertical synchronization signal Hsync/Vsync for defining a timing sequence of video data. Detecting a front porch period and a back porch period of the horizontal synchronization signal Hsync, the digital signal processor 102 can detect durations of the horizontal synchronization signal Hsync. The noise estimation unit 104 can determine the noise level of the analog video signals according to the durations of the horizontal synchronization signal Hsync, so that the digital signal processor 102 can compensate influence of noises.

In order to estimate the noise level accurately, it is important to determine the durations of the horizontal synchronization signal Hsync. In the prior art, the decision level for determining the durations of the horizontal synchronization signal Hsync is obtained by calculating a signal average value of each preset number of signal periods, counting the number of the signal periods that the signal average value is calculated, and then determining whether the signal average value is larger than a preset value and whether the number of the signal periods being counted is equal to half a number of the horizontal scan lines. If the signal average value is smaller than the preset value or the number of the signal periods being counted is equal to half the number of the horizontal scan lines, the preset value is set equal to the decision level of the horizontal synchronization signal. Conversely, when the number of times of this case (the average value is smaller than the preset value or the number of the signal periods being counted is equal to half the number of the horizontal scan lines) is greater than a predetermined value, the decision level of the horizontal synchronization signal is set as half of the sum of the preset value and the average value.

Since the prior art calculates the signal average value of each preset number of periods, the decision level of the horizontal synchronization signal Hsync is not reliable when signal-to-noise ratio (SNR) is getting worse. Hence, the determined durations of the horizontal synchronization signal Hsync are not correct, so that the noise level cannot be currently determined. In this case, the digital signal processor 102 cannot eliminate the effect of noises. Therefore, the quality of the digital video signal is poor.

SUMMARY OF THE INVENTION

It is therefore a primary objective of the claimed invention to provide a noise estimator device of a video decoder and related method.

The present invention discloses a noise estimator device of a video decoder utilized for decoding an analog video signal, comprising a reception end coupled to an output end of an analog-to-digital converter of the video decoder; a low-pass filter coupled to the reception end, for performing low-pass filtering for each period of signals received by the reception end, for generating a plurality of low-pass filtering results; a delay unit coupled to the reception end, for prolonging a timing sequence of the signals received by the reception end; a minimum level estimation unit coupled to the low pass filter, for estimating a minimum value of a specific number of low-pass filtering results in the plurality of the low-pass filtering results; a difference level estimation unit coupled to the low pass filter, the delay unit, and the minimum level estimation unit, for determining a synchronization signal of the analog video signal according to the plurality of the low-pass filtering results and the minimum value of the specific number of the low-pass filtering results, and estimating a noise level of the analog video signal according to the synchronization signal and signals outputted from the delay unit; and an output end coupled to the difference level estimation unit, for outputting the estimating result of the difference level estimation unit to a digital signal processor of the video decoder.

The present invention further discloses a noise estimating method of a video decoder, the video decoder utilized for decoding an analog video signal, the noise estimating comprising transforming the analog video signal into a digital video signal; performing low-pass filtering for each period of the digital video signal for generating a plurality of low-pass filtering results; comparing the plurality of low-pass filtering results for updating a minimum value of the plurality of low-pass filtering results; counting a number of times the minimum value is not updated; and calculating noise levels of the analog video signal when the number of times is greater than a specific number.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
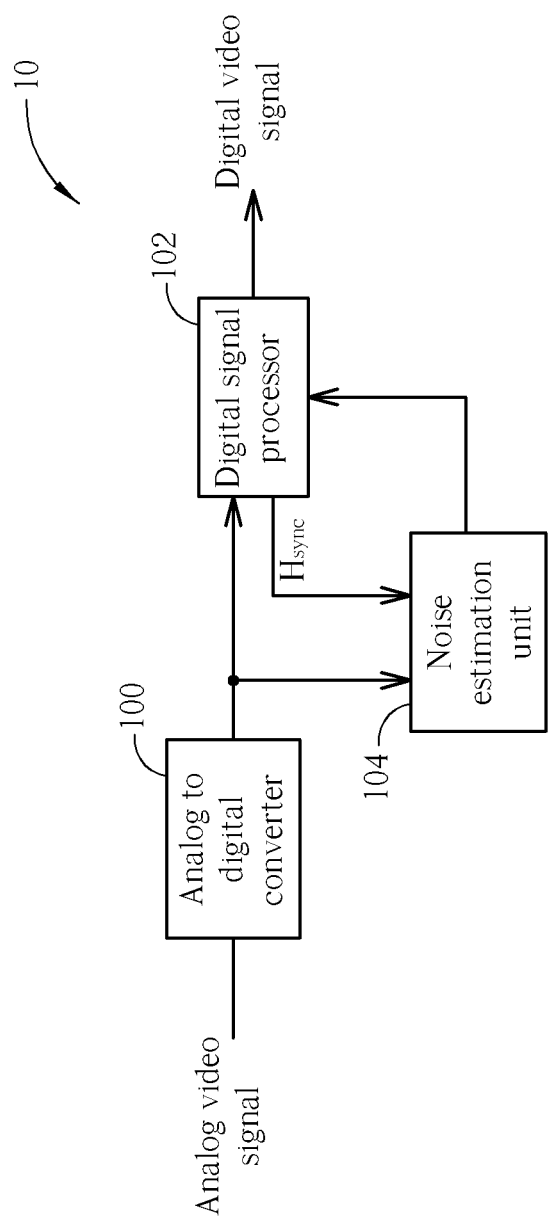
FIG. 1 is a schematic diagram of a prior art video decoder device.
Figure 2:
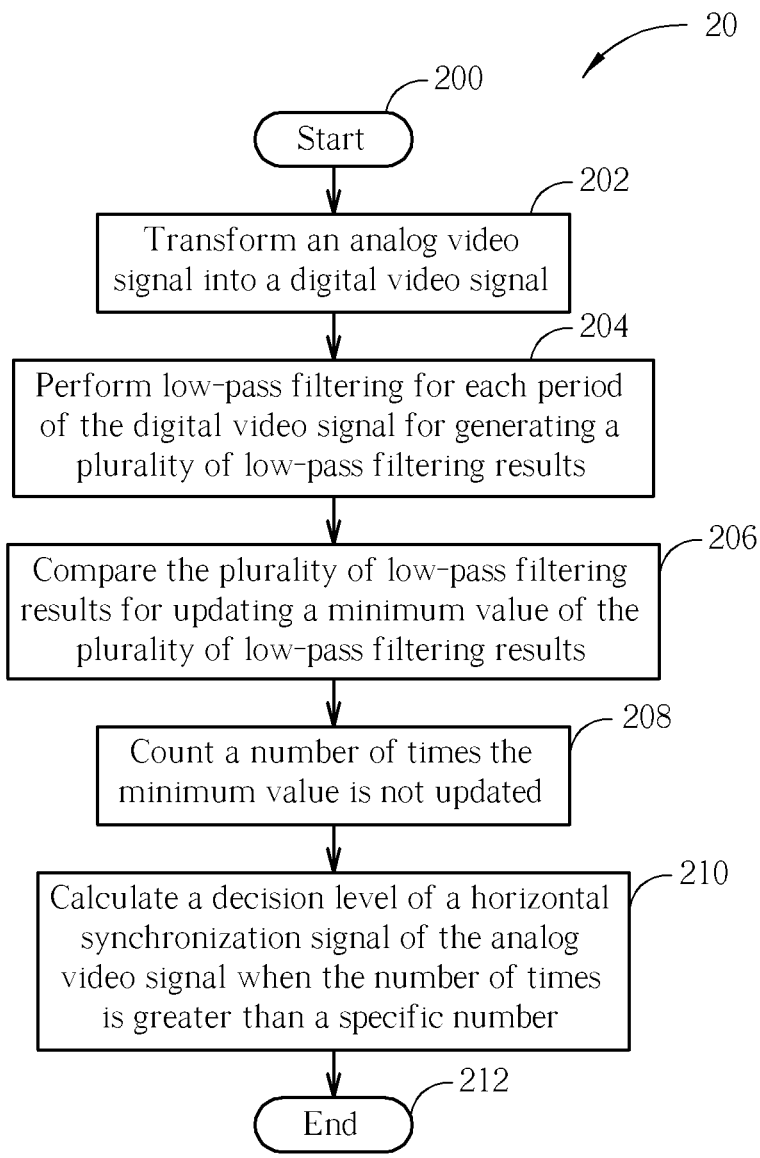
FIG. 2 is a schematic diagram of a process according to an embodiment of the present invention.

Please refer to FIG. 2. FIG. 2 is a schematic diagram of a process 20 according to an embodiment of the present invention. The process 20 is utilized for estimating noises in a video decoder, and includes the following steps:

Step 200: start.

Step 202: transform an analog video signal into a digital video signal.

Step 204: perform low-pass filtering for each period of the digital video signal for generating a plurality of low-pass filtering results.

Step 206: compare the plurality of low-pass filtering results for updating a minimum value of the plurality of low-pass filtering results.

Step 208: count a number of times the minimum value is not updated.

Step 210: calculate a decision level of a horizontal synchronization signal of the analog video signal when the number of times is greater than a specific number.

Step 212: end.

According to the process 20, the present invention performs low-pass filtering for each period of the digital video signal after transforming the analog video signal into the digital video signal, compares each low-pass filtering result for updating a minimum value of the plurality of low-pass filtering results, and then counts the number of times the minimum value is not updated. If the number of times the minimum value is not updated is greater than a specific number, the minimum value can be added an offset value as the horizontal synchronization signal decision level of the analog video signal.

Since the present invention performs low-pass filtering for each period of the digital video signal and compares each low-pass filtering result, even when the signal-to-noise ratio (SNR) is very bad, the process 20 can correctly determine the durations of the synchronization signal through each low-pass filtering result. Therefore, the process 20 can calculate the decision level of the horizontal synchronization signal accurately without horizontal synchronization signals provided by the digital signal processor.

Figure 3:
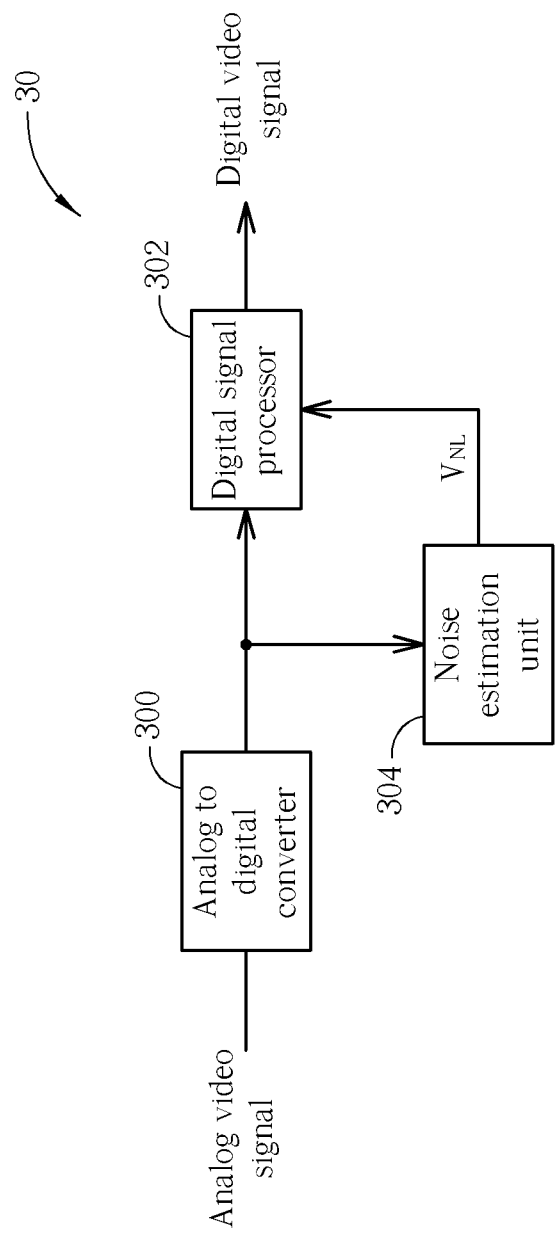
FIG. 3 is a schematic diagram of a video decoder according to an embodiment of the present invention.

As for the implementation of the process 20, please refer to FIG. 3. FIG. 3 is a schematic diagram of a video decoder 30 according to an embodiment of the present invention. The video decoder 30 includes an analog to digital converter 300, a digital signal processor 302, and a noise estimation unit 304. The analog to digital converter 300 is utilized for sampling and transforming analog video signals into digital signals. The digital signal processor 302 is utilized for performing calculations (such as demodulation or decoding) of signals outputted from the analog to digital converter 300, and outputs digital video signals to a video output device. Generally, a video signal includes a horizontal or vertical synchronization signal for defining a timing sequence of video data. In the present invention, the noise estimation unit 304 can determine durations of the horizontal synchronization signal, and calculate a noise level $V_{NL}$ of the analog video signal, so that the digital signal processor 302 can accordingly compensate influence of noises according to the noise level $V_{NL}$.

Therefore, as shown in FIG. 3, in the present invention, the noise estimation unit 304 can determine the durations of the synchronization signal without receiving any synchronization signal from the digital signal processor 302. The noise estimation unit 304 performs low-pass filtering for each period of the digital video signal outputted from the analog to digital converter 300, compares each low-pass filtering result for updating the minimum value of the plurality of low-pass filtering results, counts the number of times the minimum value is not updated, and adds the minimum value an offset value as a horizontal synchronization signal decision level of the analog video signal when the number of times is greater than a specific number. The detailed description is stated in the following.

Figure 4:
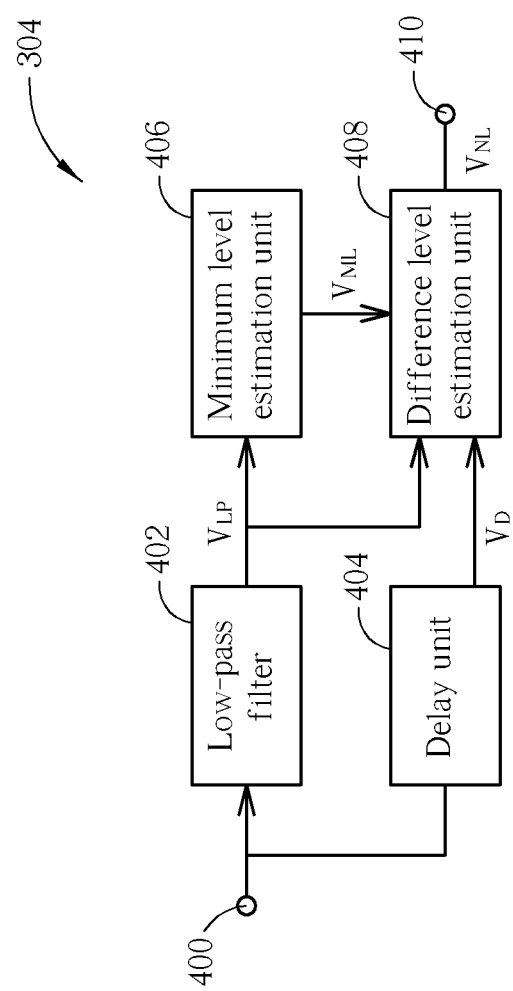
FIG. 4 is a schematic diagram of the noise estimation unit in FIG. 3.

Please refer to FIG. 4. FIG. 4 is a schematic diagram of the noise estimation unit 304 in FIG. 3. The noise estimation unit 304 includes a reception end 400, a low-pass filter 402, a delay unit 404, a minimum level estimation unit 406, a difference level estimation unit 408, and an output end 410. The reception end 400 is utilized for receiving the digital signals outputted from the analog to digital converter 300. The low-pass filter 402 is utilized for performing low-pass filtering for each period of signals received by the reception end 400 and generating a low-pass filtering result $V_{LP}$. The delay unit 404 is utilized for prolonging a timing sequence of the signals received by the reception end 400 (preferably a period), and outputting a delay signal $V_D$. The minimum level estimation unit 406 is coupled to the low pass filter 402, and is utilized for estimating a minimum level $V_{ML}$ of a specific number of the low-pass filtering results in the plurality of the low-pass filtering results $V_{LP}$. The difference level estimation unit 408 is coupled to the low pass filter 402, the delay unit 404, and the minimum level estimation unit 406, and is utilized for determining durations of the synchronization signal of the analog video signal according to the plurality of the low-pass filtering results $V_{LP}$ and the minimum level $V_{ML}$ of the specific number of the low-pass filtering results, and estimating a noise level $V_{NL}$ of the analog video signal according to the determined durations of the synchronization signal and the delay signal $V_D$ outputted from the delay unit 404. At last, through the output end 410, the noise estimation unit 304 outputs the estimated noise level $V_{NL}$ to the digital signal processor 302, so that the digital signal processor 302 can compensate influence of noises correspondingly.

Therefore, the noise estimation unit 304 obtains the low-pass filtering result $V_{LP}$ of each signal period through the low-pass filter 402, and the delay signal $V_D$ of the digital signals outputted from the analog to digital converter 300 through the delay unit 404. Then, the minimum level estimation unit 406 can determine the minimum level $V_{ML}$ of the specific number of the low-pass filtering results according to the low-pass filtering result $V_{LP}$ of each signal period. At last, the difference level estimation unit 408 determines the durations of the synchronization signal and the noise level $V_{NL}$ according to the low-pass filtering result $V_{LP}$, the minimum level $V_{ML}$, and the delay signal $V_D$.

Figure 5:
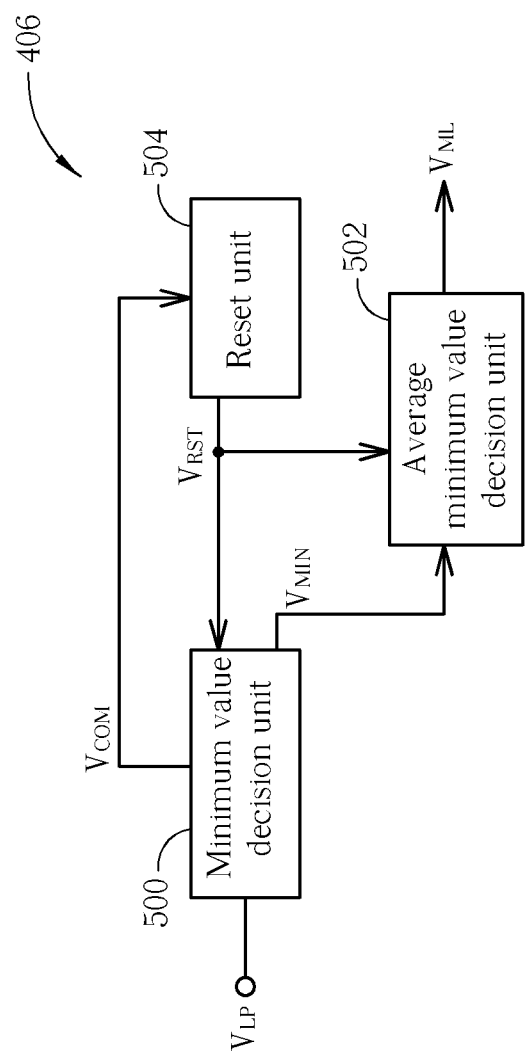
FIG. 5 is a schematic diagram of the minimum level estimation unit in FIG. 4.

Please refer to FIG. 5. FIG. 5 is a schematic diagram of the minimum level estimation unit 406 in FIG. 4. The minimum level estimation unit 406 includes a minimum value decision unit 500, an average minimum value decision unit 502, and a reset unit 504. The minimum value decision unit 500 is coupled to the low pass filter 402, and is utilized for determining a smaller low-pass filtering result between a current low-pass filtering result and a prior low-pass filtering result of the plurality of the low-pass filtering results $V_{LP}$, and for generating a current minimum value $V_{MIN}$. The average minimum value decision unit 502 is coupled to the minimum value decision unit 500 and the difference level estimation unit 408, and is utilized for mixing the current minimum value $V_{MIN}$ and a prior minimum value according to a weighting value α, and outputting $V_{ML}$ to the difference level estimation unit 408. The reset unit 504 is coupled to the minimum value decision unit 500 and the average minimum value decision unit 502, and is utilized for outputting a reset signal $V_{RST}$ for resetting the minimum value decision unit 500 and the average minimum value decision unit 502 according to a comparison signal $V_{COM}$ of the minimum value decision unit 500 when a first number of current low-pass filtering results are not smaller than corresponding prior low-pass filtering results. Preferably, the first number is related to a number of horizontal lines of the analog video signal, such as half of the number of the horizontal lines.

Therefore, in the minimum level estimation unit 406, the average minimum value decision unit 502 can mix the current minimum value $V_{MIN}$ and a prior minimum value $V_{MIN}$ determined by the minimum value decision unit 500, and output the minimum level $V_{ML}$. The reset unit 504 can prevent the decision level of the synchronization signal from being determined erroneously when the signal level drifts or noise interference is severe. Hence, when the specific number of current low-pass filtering results are not smaller than corresponding prior low-pass filtering results, that is, when the number of times the minimum value is not updated by the minimum value decision unit 500 is larger than the specific number, the minimum value decision unit 500 and the average minimum value decision unit 502 are reset for enhancing the determination accuracy.

Figure 6:
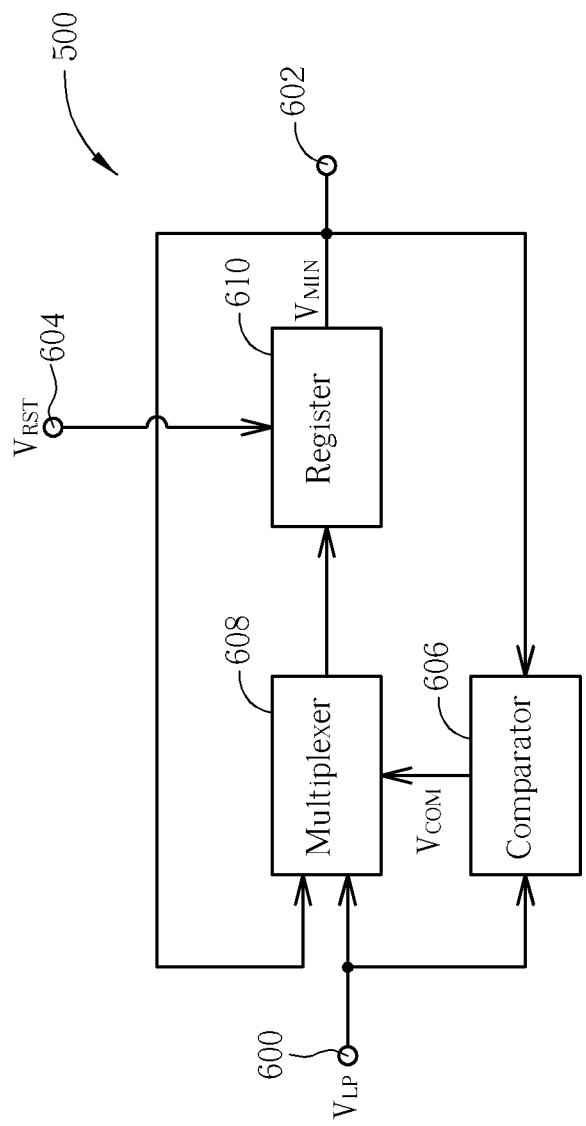
FIG. 6 is a schematic diagram of the minimum value decision unit in FIG. 5.

Please refer to FIG. 6. FIG. 6 is a schematic diagram of the minimum value decision unit 500 in FIG. 5. The minimum value decision unit 500 includes a reception end 600, an output end 602, a reset end 604, a comparator 606, a multiplexer 608, and a register 610. The reception end 600 is coupled to the low-pass filter 402, and is utilized for receiving the low-pass filtering result $V_{LP}$. The output end 602 is coupled to the average minimum value decision unit 502, and is utilized for outputting the current minimum value $V_{MIN}$. The reset end 604 is coupled to the reset unit 504, and is utilized for receiving the reset signal $V_{RST}$ outputted from the reset unit 504. The comparator 606 is coupled to the reception end 600 and the output end 602, and is utilized for comparing the low-pass filtering result $V_{LP}$ and the current minimum value $V_{MIN}$. The multiplexer 608 is coupled to the reception end 600, the output end 602, and the comparator 606, and is utilized for selecting to output the low-pass filtering result $V_{LP}$ received by the reception end 600 or the current minimum value $V_{MIN}$ according to the comparison signal $V_{COM}$ outputted from the comparator 606. The register 610 is coupled to the multiplexer 608, the reset end 604, and the output end 602, and is utilized for storing and transmitting signals outputted from the multiplexer 608 to the output end 602, and clearing the stored data according to the reset signal $V_{RST}$ outputted from the reset unit 504.

When the current low-pass filtering result $V_{LP}$ is received by the reception end 600, the comparator 606 compares the current low-pass filtering result $V_{LP}$ and the current minimum value $V_{MIN}$, and controls the multiplexer 608 through the comparison signal $V_{COM}$. If $V_{LP}$ is smaller than $V_{MIN}$, $V_{LP}$ is selected as the new current minimum value $V_{MIN}$ and stored in the register 610 through the multiplexer 608. Oppositely, if $V_{LP}$ is larger than $V_{MIN}$, the $V_{MIN}$ stored in the register 610 will not be updated. Furthermore, the comparison signal $V_{COM}$ outputted from the comparator 606 is also transmitted to the reset unit 504 for determining whether the number of times the current minimum value $V_{MIN}$ stored in the register 610 is not updated is over the specific number. When the number of times the $V_{MIN}$ stored in the register 610 is not updated is over the specific number, the reset unit 504 outputs the reset signal $V_{RST}$ through the reset end 604 for resetting the register 610. Therefore, the minimum value decision unit 500 can appropriately update the minimum value of the low-pass filtering result $V_{LP}$, and reset the register 610 according to the reset signal $V_{RST}$.

Figure 7:
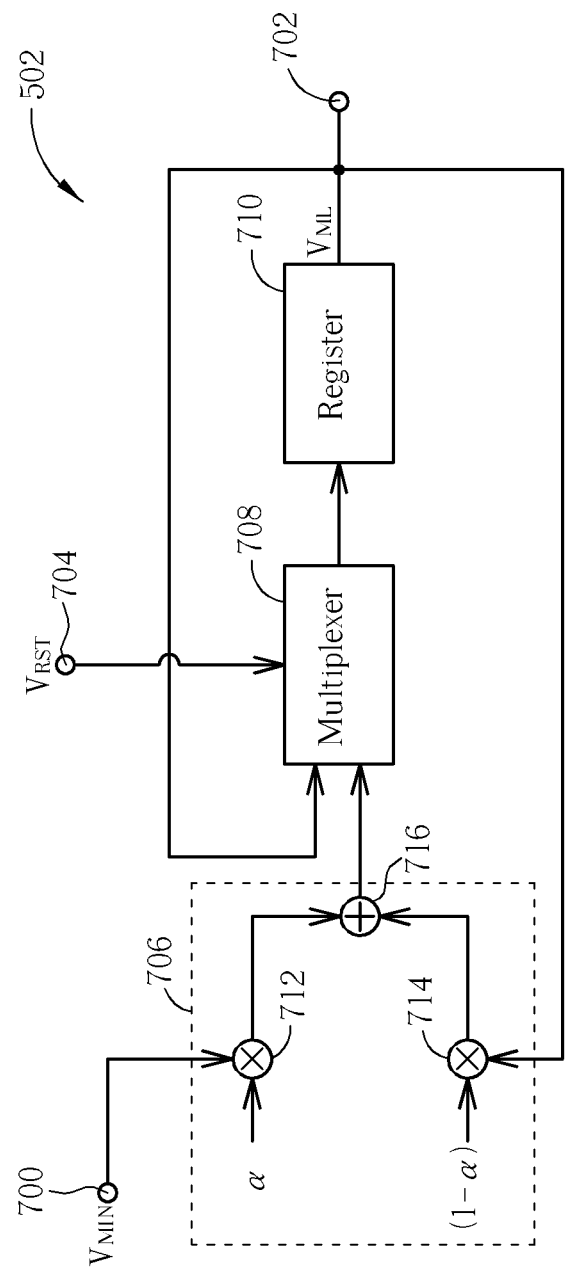
FIG. 7 is a schematic diagram of the average minimum value decision unit in FIG. 5.

Please refer to FIG. 7. FIG. 7 is a schematic diagram of the average minimum value decision unit 502 in FIG. 5. The average minimum value decision unit 502 includes a reception end 700, an output end 702, a reset end 704, a mixing unit 706, a multiplexer 708, and a register 710. The reception end 700 is coupled to the minimum value decision unit 500, and is utilized for receiving the current minimum value $V_{MIN}$. The output end 702 is coupled to the difference level estimation unit 408, and is utilized for outputting the average minimum level $V_{ML}$. The reset end 704 is coupled to the reset unit 504, and is utilized for receiving the reset signal $V_{RST}$ outputted from the reset unit 504. The mixing unit 706 is utilized for mixing signals of the reception end 700 and the output end 702, and includes multipliers 712 and 714, and an adder 716. The multiplier 712 calculates multiplication results of the current minimum value $V_{MIN}$ and the weighting value α. The multiplier 714 calculates multiplication results of the average minimum level $V_{ML}$ and (1−α). The adder 716 calculates and outputs a summation result of the multiplication results of the multipliers 712 and 714 to the multiplexer 708. The multiplexer 708 is coupled to the adder 716, the output end 702, and the reset end 704, and is utilized for selecting to output the summation result outputted from the adder 716 or the signals of the output end 702 according to the reset signal $V_{RST}$ received by the reset end 702. The register 710 is utilized for storing and transmitting the signals outputted from the multiplexer 708 to the output end 702.

Through the mixing unit 706, the average minimum value decision unit 502 mixes the current minimum value $V_{MIN}$ outputted from the minimum value decision unit 500 and the minimum level $V_{ML}$ outputted from the register 710, and averages the minimum value according to the weighting value α for increasing reliability. The reset unit 504 can output the reset signal $V_{RST}$ through the reset end 704 to control the multiplexer 708 for increasing the determination accuracy.

Figure 8:
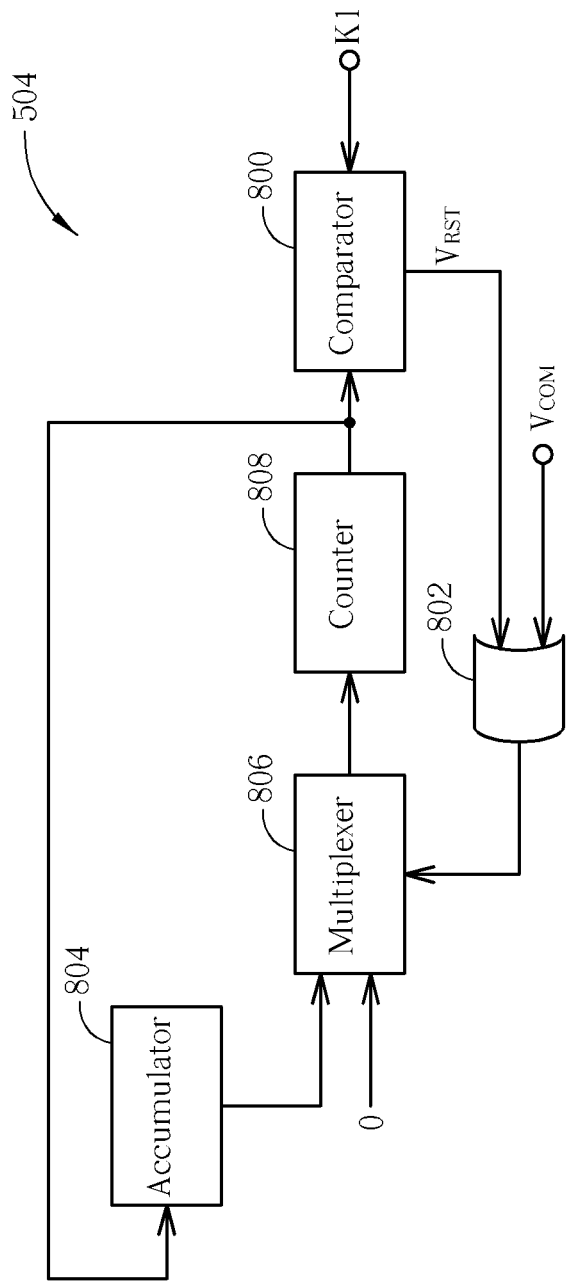
FIG. 8 is a schematic diagram of the rest unit in FIG. 5.

Please refer to FIG. 8. FIG. 8 is a schematic diagram of the rest unit 504 in FIG. 5. The reset unit 504 includes a comparator 800, an OR gate 802, an accumulator 804, a multiplexer 806, and a counter 808. The comparator 800 is utilized for comparing a predetermined value K1 and a count value outputted from the counter 808, and outputting the reset signal $V_{RST}$ as the comparison result to the OR gate 802 (the minimum value decision unit 500 and the average minimum value decision unit 502). The OR gate 802 is coupled to the comparator 800 and the minimum value decision unit 500, and is utilized for outputting an OR operation result according to the reset signal $V_{RST}$ and the comparison signal $V_{COM}$.

The multiplexer 806 is utilized for selecting to output the accumulating result of the accumulator 804 or the value 0 to the counter 808 according to the OR operation result of the OR gate 802. The counter 808 can output a count value of signals outputted from the multiplexer 806 to the comparator 800 and the accumulator 804. The accumulator 804 can add the count value of the counter 808 with a specific value, such as 1.

The reset unit 504 is utilized for determining whether the number of times the minimum value is not updated by the minimum value decision unit 500 is over the predetermined value K1. If the number of times is greater than the predetermined value K1, the minimum value decision unit 500 and the average minimum value decision unit 502 are reset by the reset signal $V_{RST}$. Firstly, the OR gate 802 performs an OR operation according to the reset signal $V_{RST}$ and the comparison signal $V_{COM}$ outputted from the minimum value decision unit 500. If the minimum value is not updated by the minimum value decision unit 500, the multiplexer 806 outputs the result of the accumulator 804, which means that the number of times the minimum value is not updated by the minimum value decision unit 500 is increased one time. In this way, when the number of times the minimum value is not updated by the minimum value decision unit 500 is greater than or equal to the predetermined value K1, the minimum value decision unit 500 and the average minimum value decision unit 502 are reset by the reset signal $V_{RST}$. Therefore, the noise level can be prevented from being determined inaccurately when the signal level drifts or noise interference is severe. Preferably, the predetermined value K1 is related to the number of horizontal lines of the analog video signal, such as half of the number of horizontal lines of the analog video signal.

As mentioned above, the minimum level estimation unit 406 determines the current minimum value $V_{MIN}$ through the minimum value decision unit 500, and determines the minimum level $V_{ML}$ through the average minimum value decision unit 502. Furthermore, the reset unit 504 can prevent the noise level from being determined inaccurately when the signal level drifts or noise interference is severe. When the number of times the minimum value is not updated by the minimum value decision unit 500 is larger than the predetermined value K1, the reset unit 504 can reset the minimum value decision unit 500 and the average minimum value decision unit 502 for increasing the determination accuracy. After the minimum level $V_{ML}$ is determined, the difference level estimation unit 408 can determine the noise level $V_{NL}$ according to the low-pass filtering result $V_{LP}$, the minimum level $V_{ML}$, and the delay signal $V_D$.

Figure 9:
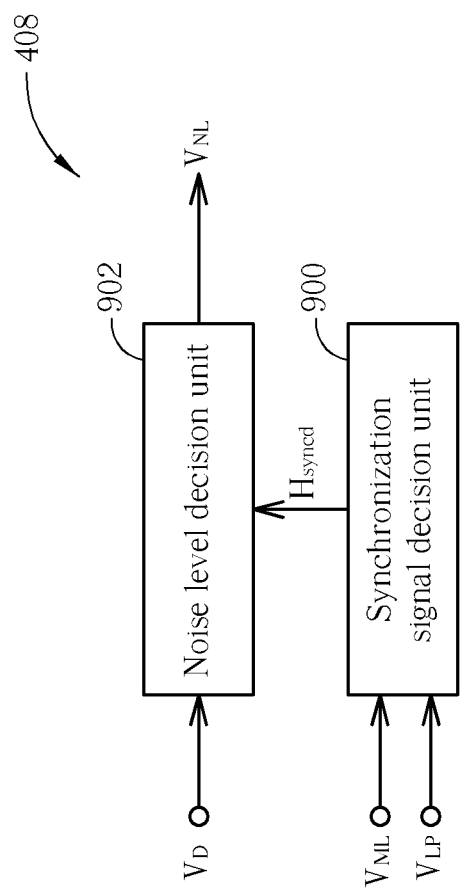
FIG. 9 is a schematic diagram of the difference level estimation unit in FIG. 4.

Please refer to FIG. 9. FIG. 9 is a schematic diagram of the difference level estimation unit 408 in FIG. 4. The difference level estimation unit 408 includes a synchronization signal decision unit 900 and a noise level decision unit 902. The synchronization signal decision unit 900 is coupled to the low-pass filter 402 and the minimum level estimation unit 406, and is utilized for determining the durations of the horizontal synchronization signal Hsyncd according to the low-pass filtering results $V_{LP}$ outputted from the low-pass filter 402 and the minimum value VML estimated by the minimum level estimation unit 406. The noise level decision unit 902 is coupled to the synchronization signal decision unit 900 and the delay unit 404, and is utilized for calculating the noise level $V_{NL}$ of the delay signals $V_D$ outputted from the delay unit 404 according to the durations of the horizontal synchronization signal Hsyncd.

Figure 10:
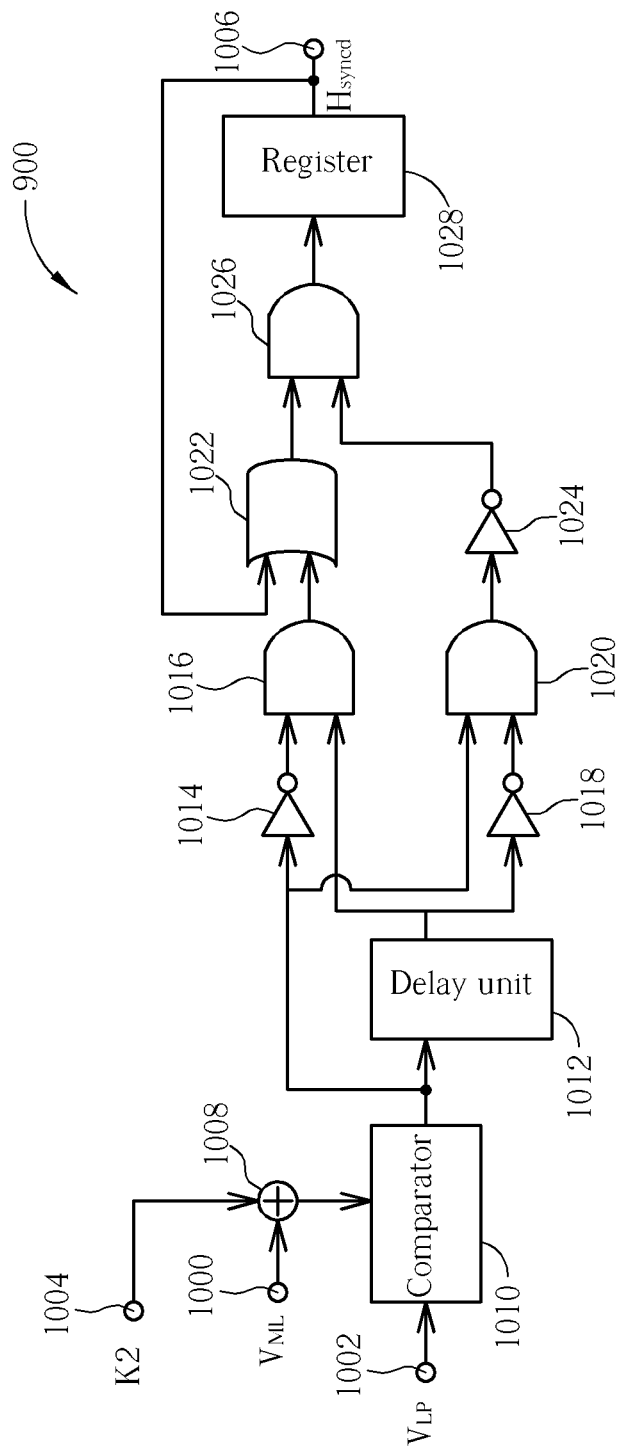
FIG. 10 is a schematic diagram of the synchronization signal decision unit in FIG. 9.

Please further refer to FIG. 10. FIG. 10 is a schematic diagram of the synchronization signal decision unit 900 in FIG. 9. The synchronization signal decision unit 900 includes input ends 1000, 1002, and 1004, an output end 1006, an adder 1008, a comparator 1010, a delay unit 1012, inverters 1014, 1018, and 1024, AND gates 1016, 1020, and 1026, an OR gate 1022, and a register 1028. The input end 1000 is coupled to the minimum level estimation unit 406, and is utilized for receiving the minimum level $V_{ML}$. The input end 1002 is coupled to the low-pass filter 402, and is utilized for receiving the low-pass filtering results $V_{LP}$. The input end 1004 is utilized for receiving an offset value K2. The output end 1006 is utilized for outputting the durations of the horizontal synchronization signal Hsyncd to the noise level decision unit 902. The adder 1008 is coupled to the input ends 1000 and 1008, and is utilized for calculating a summation result of the minimum level $V_{ML}$ estimated by the minimum level estimation unit 406 and the offset value K2. The comparator 1010 is coupled to the adder 1008 and the input end 1002, and is utilized for comparing the summation result provided by the adder 1008 and the low-pass filtering results $V_{LP}$ outputted from the low-pass filter 402. The delay unit 1012 is utilized for prolonging a timing sequence of the comparison result provided by the comparator 1010. The inverters 1014, 1018, and 1024 are utilized for converting phases of the received signals 180°. The AND gates 1016, 1020, and 1026 are utilized for performing AND operations. The OR gate 1022 is utilized for performing an OR operation.

In the synchronization signal decision unit 900, the comparator 1010 compares the summation result of the adder 1008 and the signals of the input end 1002, and transmits the comparison result to the delay unit 1012, the inverter 1014, and the AND gate 1020. The delay unit 1012 prolongs the timing sequence of the comparison result of the comparator 1010 with the predetermined periods, and transmits to the AND gate 1016 and the inverter 1018. After the inverter 1014 converts the phase of the comparison result of the comparator 1010 for the AND gate 1016, the AND gate 1016 can output the AND operation of the output signals of the inverter 1014 and the delay unit 1012 to the OR gate 1022. The OR gate 1022 then outputs the OR operation result of the signals of the output end 1006 and the AND operation result of the AND gate 1016 to the AND gate 1026. On the other hand, after the inverter 1018 converts the phase of the output signal of the delay unit 1012 for the AND gate 1020, the AND gate 1020 can output the AND operation result of the inverter 1018 and the comparison result of the comparator 1010 to the inverter 1024. The inverter 1024 converts the phase of the AND operation result of the AND gate 1020 and outputs to the AND gate 1026. The AND gate 1026 then outputs the AND operation of the OR operation result of the OR gate 1022 and the inversion result of the inverter 1024, and stores the AND operation in the register 1028. At last, the register 1028 outputs the durations of the horizontal synchronization signal Hsyncd through the output end. Therefore, the synchronization signal decision unit 900 utilizes the decision level of the horizontal synchronization signal for determining whether the current signal level and the signal level of prior predetermined periods (the periods delayed by the delay unit 1012) are changed from high to low or low to high, so as to decide the durations of the horizontal synchronization signal Hsyncd.

Figure 11:
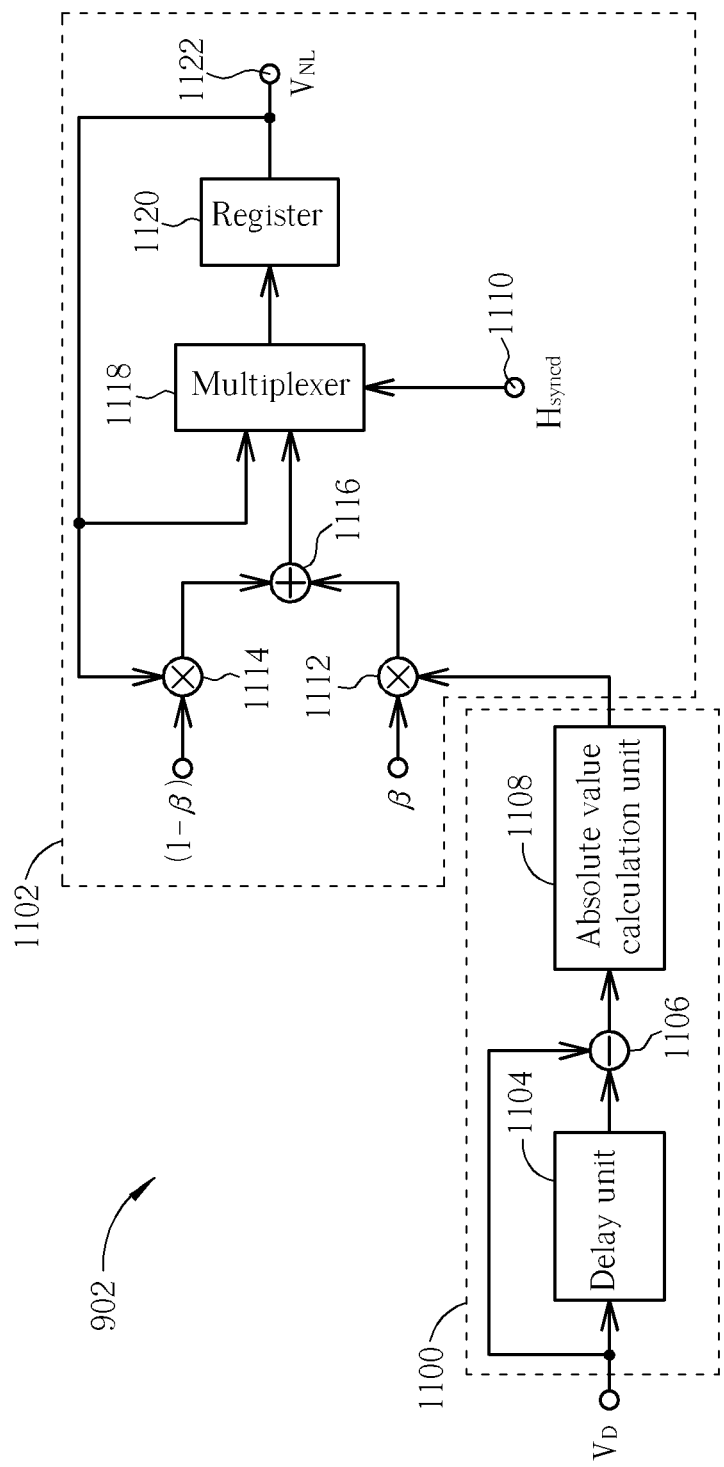
FIG. 11 is a schematic diagram of the noise level decision unit in FIG. 9.

Please refer to FIG. 11. FIG. 11 is a schematic diagram of the noise level decision unit 902 in FIG. 9. The noise level decision unit 902 includes a noise level estimation unit 1100 and an average noise level decision unit 1102. The noise level estimation unit 1100 is coupled to the delay unit 404, is utilized for determining noise levels of the delay signal $V_D$, and includes a delay unit 1104, a subtraction unit 1106, and an absolute value calculation unit 1108. The delay unit 1104 is coupled to the delay unit 404, and is utilized for prolonging the timing sequence of the delay signal $V_D$ a predetermined period. The subtraction unit 1106 is coupled to the delay unit 404 and 1104, and is utilized for calculating differences between the delay signal $V_D$ and the signal outputted from the delay unit 1104. The absolute value calculation unit 1108 is coupled to the subtraction unit 1106 and the average noise level decision unit 1102, and is utilized for calculating and outputting absolute values of subtraction results provided by the subtraction unit 1106 to the average noise level decision unit 1102. The average noise level decision unit 1102 is coupled to the noise level decision unit 1100 and the synchronization signal decision unit 900, and is utilized for mixing a current noise level and a prior noise level according to a weighting value β, and outputting the noise level $V_{NL}$ to the output end 410 during the durations of the horizontal synchronization signal. The average noise level decision unit 1102 includes multipliers 1112 and 1114, an adder 1116, a multiplexer 1118, and a register 1120. The operation of the multipliers 1112 and 1114, and the adder 1116 is the same as that of the mixing unit 706 shown in FIG. 7, which is utilized for mixing the current noise level and the prior noise level. The multiplier 1112 is coupled to the absolute value calculation unit 1108, and is utilized for calculating multiplication results of the signals outputted from the absolute value calculation unit 1108 and the weighting value β. The multiplier 1114 is coupled to an output end 1122, and is utilized for calculating multiplication results of the signal of the output end 1122 and (1−β). The adder 1116 is coupled to the multipliers 1112 and 1114, and the multiplexer 1118, and is utilized for calculating a sum of the multiplication results of the multipliers 1112 and 1114, and outputting the sum to the multiplexer 1118. The multiplexer 1118 is coupled to the adder 1116, the output end 1122, and a synchronization signal end 1110, and is utilized for receiving the durations of the horizontal synchronization signal Hsyncd determined by the synchronization signal decision unit 900, and selecting to output the summation result of the adder 1116 or the signals of the output end 1122 to the register 1120 through the synchronization signal end 1110. The register 1120 is utilized for temporally storing the signals outputted from the multiplexer 1118, and transmitting the noise level $V_{NL}$ to the digital signal processor 302 through the output end 1122.

Therefore, in the noise level decision unit 902, the noise level estimation unit 1100 can determine the differences between the current signal level and the signal level of prior predetermined periods (the periods prolonged by the delay unit 1104), so as to obtain noise portions. On the other hand, the average noise level decision unit 1102 can mix the current noise level and the prior noise level, and output the mixed result of the current noise level and the prior noise level or the prior noise level according to the synchronization signal decision unit 900.

As mentioned above, the present invention performs low-pass filtering for each period of the digital video signal, compares each low-pass filtering result for updating a minimum value of the plurality of low-pass filtering results, counts the number of times the minimum value is not updated, and adds an offset value to the minimum value as the horizontal synchronization signal decision level of the analog video signal when the number of times is larger than a specific number. Therefore, the present invention can correctly determine the horizontal synchronization signal decision level without the horizontal synchronization signal provided by the digital signal processor. In this case, even the signal-to-noise ratio is poor, the present invention can correctly determine the horizontal synchronization signal decision level, and transmit the estimation result of the noise level to the digital signal processor for effectively eliminating the noise interference and enhancing the quality of the digital video signals.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A noise estimator device of a video decoder utilized for decoding an analog video signal, comprising:
   a reception end coupled to an output end of an analog-to-digital converter of the video decoder;
   a low-pass filter coupled to the reception end, for performing low-pass filtering for each period of signals received by the reception end, for generating a plurality of low-pass filtering results;
   a delay circuitry coupled to the reception end, configured by a first logical circuit, executing a step of prolonging a timing sequence of the signals received by the reception end;
   a minimum level estimation circuitry coupled to the low pass filter, configured by a second logical circuit, executing a step of estimating a minimum value of a specific number of low-pass filtering results in the plurality of the low-pass filtering results;
   a difference level estimation circuitry coupled to the low pass filter, the delay circuitry, and the minimum level estimation circuitry, configured by a third logical circuit, executing steps of determining a synchronization signal of the analog video signal according to the plurality of the low-pass filtering results and the minimum value of the specific number of the low-pass filtering results, and estimating a noise level of the analog video signal according to the synchronization signal and signals outputted from the delay circuitry; and
   an output end coupled to the difference level estimation circuitry, for outputting the estimating result of the difference level estimation circuitry to a digital signal processor of the video decoder.

2. The noise estimator device of claim 1, wherein the delay circuitry is utilized for prolonging the timing sequence of the signals received by the reception end with a period.

3. The noise estimator device of claim 1, wherein the minimum level estimation circuitry comprises:
   a minimum value decision circuitry coupled to the low pass filter, for determining a smaller low-pass filtering result between a current low-pass filtering result and a prior low-pass filtering result of the plurality of the low-pass filtering results, for generating a current minimum value;
   an average minimum value decision circuitry coupled to the minimum value decision circuitry and the difference level estimation circuitry, for mixing the current minimum value and a prior minimum value according to a weighting value, and outputting to the difference level estimation circuitry; and
   a reset circuitry coupled to the minimum value decision circuitry and the average minimum value decision circuitry, for resetting the minimum value decision circuitry and the average minimum value decision circuitry when a first number of current low-pass filtering results are not smaller than corresponding prior low-pass filtering results.

4. The noise estimator device of claim 3, wherein the minimum value decision circuitry comprises:
   a first reception end coupled to the low-pass filter;

a first output end coupled to the average minimum value decision circuitry;

a reset end coupled to the reset circuitry;

a comparator coupled to the first reception end and the first output end, for comparing signals of the first reception end and the first output end;

a multiplexer coupled to the first reception end, the first output end, and the comparator, for selecting to output the signals of the first reception end or the signals of the first output end according to comparison results of the comparator; and a register coupled to the multiplexer, the reset end, and the first output end, for storing and transmitting signals outputted from the multiplexer to the first output end, and clearing stored data according to signals of the reset end.

5. The noise estimator device of claim 3, wherein the average minimum value decision circuitry comprises:

a second reception end coupled to the minimum value decision circuitry;

a second output end coupled to the difference level estimation circuitry;

a reset end coupled to the reset circuitry;

a mixing circuitry coupled to the second reception end and the second output end, for mixing signals of the second reception end and the second output end according to the weighting value;

a multiplexer coupled to the mixing circuitry, the second output end, and the reset end, for selecting to output signals outputted from the mixing circuitry or signals of the second output end according to signals received by the reset end; and a register coupled to the multiplexer and the second output end, for storing and transmitting signals outputted from the multiplexer to the second output end.

6. The noise estimator device of claim 5, wherein the mixing circuitry comprises:

a first multiplier coupled to the second reception end, for calculating multiplication results of the signals of the second reception end and a first value corresponding to the weighting value;

a second multiplier coupled to the second output end, for calculating multiplication results of the signals of the second output end and a second value; and an adder coupled to the first multiplier, the second multiplier, and the multiplexer, for calculating and outputting a summation result of the multiplication results of the first multiplier and the second multiplier to the multiplexer.

7. The noise estimator device of claim 6, wherein a summation result of the first value and the second value is 1.

8. The noise estimator device of claim 3, wherein the reset circuitry comprises:

a comparator for comparing a predetermined value and a count value;

an OR gate coupled to the comparator and the minimum value decision circuitry, for outputting an OR operation result according to a comparison result of the comparator and a minimum comparison result of the minimum value decision circuitry;

an accumulator for adding the count value a first value;

a multiplexer coupled to the accumulator, the OR gate, and a second value, for selecting to output the accumulating result of the accumulator or the second value according to the OR operation result; and a counter coupled to the multiplexer, the comparator, and the accumulator for outputting the count value to the comparator and the accumulator according to signals outputted from the multiplexer.

9. The noise estimator device of claim 8, wherein the predetermined value is related to a number of horizontal lines of the analog video signal.

10. The noise estimator device of claim 8, wherein the predetermined value is half a number of horizontal lines of the analog video signal.

11. The noise estimator device of claim 8, wherein the comparator outputs a high-level signal when the predetermined value is smaller than the count value.

12. The noise estimator device of claim 8, wherein the first value is equal to 1.

13. The noise estimator device of claim 8, wherein the second value is equal to 0.

14. The noise estimator device of claim 3, wherein the first number is related to a number of horizontal lines of the analog video signal.

15. The noise estimator device of claim 3, wherein the first number is half a number of horizontal lines of the analog video signal.

16. The noise estimator device of claim 1, wherein the difference level estimation circuitry comprises:

a synchronization signal decision circuitry coupled to the low-pass filter and the minimum level estimation circuitry, for determining durations of the synchronization signal according to the plurality of the low-pass filtering results and the minimum value estimated by the minimum level estimation circuitry; and a noise level decision circuitry coupled to the synchronization signal decision circuitry and the delay circuitry, for calculating noise levels of signals outputted from the delay circuitry according to the durations of the synchronization signal determined by the synchronization signal decision circuitry.

17. The noise estimator device of claim 16, wherein the synchronization signal decision circuitry comprises:

a first input end coupled to the minimum level estimation circuitry;

a second input end coupled to the low-pass filter;

a third input end coupled to an offset value;

a third output end coupled to the noise level decision circuitry;

an adder coupled to the first input end and the third input end, for calculating a summation result of the estimation result of the minimum level estimation circuitry and the offset value;

a comparator coupled to the adder and the second input end, for comparing the summation result provided by the adder and the signals outputted from the low-pass filter;

a first delay circuitry coupled to the comparator configured by a fourth logical circuit, executing a step of prolonging a timing sequence of the comparison result provided by the comparator;

a first inverter coupled to the comparator, for generating inversion results of the comparison results provided by the comparator;

a first AND gate coupled to the first inverter and the first delay circuitry, for outputting a first AND operation result according to the inversion results provided by the first inverter and delay results provided by the first delay circuitry;

a second inverter coupled to the first delay circuitry, for generating inversion results of the delay results provided by the first delay circuitry;

a second AND gate coupled to the second inverter and the comparator, for outputting a second AND operation result according to the inversion results provided by the second inverter and the comparison results provided by the comparator;

an OR gate coupled to the third output end and the first AND gate, for outputting an OR operation result according to the first AND operation result and signals outputted from the third output end;

a third inverter coupled to the second AND gate, for generating inversion results of the second AND operation result;

a third AND gate coupled to the third inverter and the OR gate, for outputting a third AND operation result according to the inversion results provided by the third inverter and the OR operation result provided by the OR gate; and a register coupled to the third AND gate and the third output end, for temporarily storing and outputting the third AND operation result to the third output end.

18. The noise estimator device of claim 16, wherein the noise level decision circuitry comprises:

a noise level estimation circuitry coupled to the delay circuitry, for determining noise levels of the signals outputted from the delay circuitry;

an average noise level decision circuitry coupled to the noise level decision circuitry and the synchronization signal decision circuitry, for mixing a current noise level and a prior noise level according to a weighting value and outputting the mixed result to the output end during the durations of the synchronization signal determined by the synchronization signal decision circuitry.

19. The noise estimator device of claim 18, wherein the noise level estimation circuitry comprises:

a second delay circuitry coupled to the delay circuitry, for prolonging a timing sequence of the signals outputted from the delay circuitry;

a subtraction circuitry coupled to the delay circuitry and the second delay circuitry, for calculating differences between the signals outputted from the delay circuitry and signals outputted from the second delay circuitry; and an absolute value calculation circuitry coupled to the subtraction circuitry and the average noise level decision circuitry for calculating and outputting absolute values of subtraction results provided by the subtraction circuitry to the average noise level decision circuitry.

20. The noise estimator device of claim 18, wherein the average noise level decision circuitry comprises:

a forth reception end coupled to the noise level estimation circuitry;

a forth output end coupled to the output end;

a synchronization signal end coupled to the synchronization signal decision circuitry;

a mixing circuitry coupled to the forth reception end and the forth output end, for mixing signals of the forth reception end and the forth output end according the weighting value;

a multiplexer coupled to the mixing circuitry, the forth output end, and the synchronization signal end, for selecting signals outputted from the mixing circuitry or signals of the forth output end to output according to signals received by the synchronization signal end; and a register coupled to the multiplexer and the forth output end, for temporarily storing and outputting signals outputted from the multiplexer to the forth output end.

21. The noise estimator device of claim 20, wherein the mixing circuitry comprises:

a first multiplier coupled to the forth reception end, for calculating multiplication results of the signals of the forth reception end and a first value corresponding to the weighting value;

a second multiplier coupled to the forth output end, for calculating multiplication results of the signals of the forth output end and a second value; and an adder coupled to the first multiplier, the second multiplier, and the multiplexer, for calculating a sum of the multiplication results of the first multiplier and the second multiplier, and outputting to the multiplexer.

22. The noise estimator device of claim 21, wherein the sum of the first value and the second value is equal to 1.

* * * * *